(12) United States Patent
Chae et al.

(10) Patent No.: US 11,541,870 B2
(45) Date of Patent: Jan. 3, 2023

(54) METHOD FOR CONTROLLING HYBRID POWER TRAIN OF VEHICLE

(71) Applicants: Hyundai Motor Company, Seoul (KR); Kia Motors Corporation, Seoul (KR)

(72) Inventors: Min Ho Chae, Incheon (KR); Soon Ki Eo, Ansan-Si (KR); Chon Ok Kim, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 17/035,072

(22) Filed: Sep. 28, 2020

(65) Prior Publication Data

US 2022/0009478 A1    Jan. 13, 2022

(30) Foreign Application Priority Data

Jul. 10, 2020  (KR) ........................ 10-2020-0085395

(51) Int. Cl.
*B60W 20/15*  (2016.01)
*B60W 10/02*  (2006.01)
(Continued)

(52) U.S. Cl.
CPC ............. *B60W 20/15* (2016.01); *B60K 6/387* (2013.01); *B60K 6/547* (2013.01); *B60K 17/22* (2013.01);
(Continued)

(58) Field of Classification Search
CPC ...... B60W 20/15; B60W 10/02; B60W 10/06; B60W 10/08; B60W 10/11; B60W 2710/022; B60W 2710/06; B60W 2710/0666; B60W 2710/08; B60W 2710/083; B60W 2710/1005; B60K 6/387;
(Continued)

(56) References Cited

U.S. PATENT DOCUMENTS

2020/0116235 A1\* 4/2020 Chae ......................... F16H 3/66
2020/0116237 A1\* 4/2020 Chae ....................... F16H 3/666

FOREIGN PATENT DOCUMENTS

| CN | 107234964 A | * 10/2017 | ............... B60K 1/02 |
| EP | 3284978 A1 | * 2/2018 | ............. B60K 6/442 |
| KR | 10-2015-0070488 | 6/2015 | |

\* cited by examiner

*Primary Examiner* — Tisha D Lewis
(74) *Attorney, Agent, or Firm* — Morgan, Lewis & Bockius LLP

(57) ABSTRACT

A method of controlling a hybrid power train may include: driving a first input shaft connected to a second motor-generator by the second motor-generator to synchronize a speed of a driven gear of a target gear position with a speed of an output shaft; moving a sleeve to directly connect the second input shaft, the output shaft, and the driven gear of the target gear position; decreasing torque of the first motor-generator and increasing torque of the second motor-generator to converge torque transferred from the second motor-generator to the output shaft, to torque of the output shaft; moving the sleeve to release the second input shaft and maintain only the output shaft and the driven gear; and increasing torque of an engine and decreasing the torque of the second motor-generator to converge torque transferred from the engine to the output shaft, to the torque of the output shaft.

10 Claims, 21 Drawing Sheets

(51) Int. Cl.
   *B60W 10/06* (2006.01)
   *B60W 10/08* (2006.01)
   *B60W 10/11* (2012.01)
   *B60K 6/387* (2007.10)
   *B60K 6/547* (2007.10)
   *F16H 61/02* (2006.01)
   *B60K 17/22* (2006.01)
   *F16H 61/684* (2006.01)
   *F16D 11/14* (2006.01)
   *F16H 61/00* (2006.01)

(52) U.S. Cl.
   CPC ............ *B60W 10/02* (2013.01); *B60W 10/06* (2013.01); *B60W 10/08* (2013.01); *B60W 10/11* (2013.01); *F16D 11/14* (2013.01); *F16H 61/0213* (2013.01); *F16H 61/684* (2013.01); *B60W 2710/022* (2013.01); *B60W 2710/06* (2013.01); *B60W 2710/0666* (2013.01); *B60W 2710/08* (2013.01); *B60W 2710/083* (2013.01); *B60W 2710/1005* (2013.01); *B60Y 2200/92* (2013.01); *B60Y 2300/42* (2013.01); *B60Y 2300/73* (2013.01); *B60Y 2400/422* (2013.01); *F16D 2500/1066* (2013.01); *F16D 2500/1085* (2013.01); *F16D 2500/10412* (2013.01); *F16D 2500/10456* (2013.01); *F16D 2500/1107* (2013.01); *F16D 2500/50638* (2013.01); *F16D 2500/70458* (2013.01); *F16D 2500/70488* (2013.01); *F16H 2061/0075* (2013.01); *F16H 2306/48* (2013.01); *F16H 2708/22* (2013.01)

(58) Field of Classification Search
   CPC ......... B60K 6/547; B60K 17/22; F16D 11/14; F16D 2500/10412; F16D 2500/10456; F16D 2500/1066; F16D 2500/1085; F16D 2500/1107; F16D 2500/50638; F16D 2500/704058; F16D 2500/70488; F16H 61/0213; F16H 61/684; F16H 2061/0075; F16H 2306/48; F16H 2708/22; B60Y 2200/92; B60Y 2300/42; B60Y 2300/73; B60Y 2400/422
   See application file for complete search history.

FIG. 2
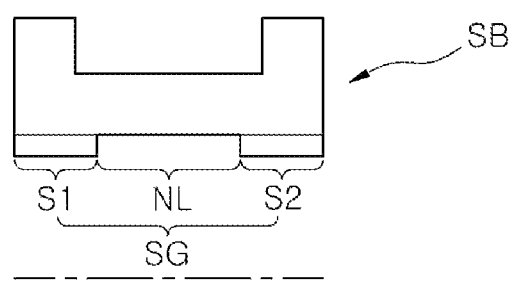
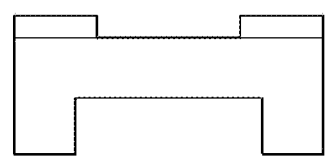

FIG. 3

| Mode | Positions of sleeve |
|---|---|
| First mode (first gear position) | L at CG1–HB |
| Second mode (second gear position) | R at CG3–CG2 |
| Third mode (EV) | N at HB–CG3 |
| Fourth mode (three-shaft direct connection) | NL at CG1–HB–CG3 |
| Fifth mode (three-shaft direct connection) | NR at HB–CG3–CG2 |

Terminals: CG1, HB, CG3, CG2

METHOD FOR CONTROLLING HYBRID POWER TRAIN OF VEHICLE

CROSS REFERENCE TO RELATED APPLICATION

The present application claims priority to Korean Patent Application No. 10-2020-0085395, filed on Jul. 10, 2020, the entire contents of which is incorporated herein for all purposes by this reference.

BACKGROUND OF THE INVENTION

Field of the Invention

The present invention relates to a technology for controlling a hybrid power train of a vehicle.

Description of Related Art

A hybrid power train of a vehicle operates the vehicle through a proper combination of engine power and motor power, to ensure excellent and improved power performance of the vehicle, and enhance the fuel efficiency of the vehicle.

A hybrid power train as described above is required to implement various modes through a comparatively simple configuration, and minimize unnecessary drag.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hybrid power train of a vehicle, which can implement various modes through a comparatively simple configuration, and minimize unnecessary drag to largely enhance the fuel efficiency of the vehicle.

In accordance with the above aspect, a method for controlling a hybrid power train of a vehicle according to various exemplary embodiments of the present invention includes: while a second input shaft connected to a first motor-generator is operated by the first motor-generator to allow the vehicle to travel in an electric vehicle (EV) mode, driving a first input shaft connected to a second motor-generator by the second motor-generator to synchronize a speed of a driven gear of a target gear position with a speed of an output shaft; primarily moving a sleeve to directly connect the second input shaft, the output shaft, and the driven gear of the target gear position; decreasing torque of the first motor-generator and increasing torque of the second motor-generator to converge torque transferred from the second motor-generator to the output shaft, to torque of the output shaft; secondarily moving the sleeve to release the second input shaft and maintain only the output shaft and the driven gear of the target gear position to be directly connected; and increasing torque of an engine and decreasing the torque of the second motor-generator to converge torque transferred from the engine to the output shaft, to the torque of the output shaft.

The method may further include: after the sleeve is secondarily moved to release the second input shaft from the output shaft, turning, by the controller, off the first motor-generator.

The method may further include: before the converging of the torque transferred from the engine to the output shaft, to the torque of the output shaft, starting, by the controller, the engine.

If the target gear position is a first gear position, the primary moving of the sleeve may include moving the sleeve, which has been gear-engaged only to a third clutch gear fixed to the second input shaft and a hub gear fixed to the output shaft such that the sleeve is additionally gear-engaged to a first clutch gear integrally connected to a first driven gear.

The primary moving of the sleeve may include moving the sleeve, a first section which has been gear-engaged to the hub gear and a second section of which has been gear-engaged to the third clutch gear such that the first section of the sleeve is additionally gear-engaged to the first clutch gear while being gear-engaged to the hub gear, and the second section of the sleeve is additionally gear-engaged to the hub gear while being gear-engaged to the third clutch gear.

The secondary moving of the sleeve may include moving the sleeve such that the first section of the sleeve is disconnected from the hub gear and is gear-engaged only to the first clutch gear, and the second section of the sleeve is disconnected from the third clutch gear and is gear-engaged only to the hub gear.

If the target gear position is a second gear position, the primary moving of the sleeve may include moving the sleeve, which has been gear-engaged only to a third clutch gear fixed to the second input shaft and a hub gear fixed to the output shaft such that the sleeve is additionally gear-engaged to a second clutch gear fixedly connected to a second driven gear rotatably mounted on the second input shaft.

The primary moving of the sleeve may include moving the sleeve, a first section of which has been gear-engaged to the hub gear and a second section of which has been gear-engaged to the third clutch gear such that the first section of the sleeve is maintained to be gear-engaged to the hub gear, and the second section of the sleeve is additionally gear-engaged to the second clutch gear while being gear-engaged to the third clutch gear.

The secondary moving of the sleeve may include moving the sleeve such that a first section of the sleeve is maintained to be gear-engaged to the hub gear, and a second section of the sleeve is disconnected from the third clutch gear and is gear-engaged only to the second clutch gear.

Furthermore in accordance, in accordance with the above aspect, a method for controlling a hybrid power train of a vehicle according to various exemplary embodiments of the present invention includes: while a first input shaft is operated by an engine fixed to the first input shaft to allow the vehicle to travel, decreasing torque of the engine and increasing torque of a second motor-generator connected to the first input shaft to converge torque transferred from the second motor-generator to an output shaft, to torque of the output shaft; driving a second input shaft connected to a first motor-generator by the first motor-generator to synchronize a speed of a third clutch gear fixed to the second input shaft with a speed of the output shaft; moving a sleeve to connect the second input shaft to a hub gear fixed to the output shaft; and increasing torque of the first motor-generator and decreasing the torque of the second motor-generator to converge the torque of the first motor-generator to the torque of the output shaft.

The method may further include: after the torque transferred from the second motor-generator to the output shaft is converged to the torque of the output shaft, turning, by the controller, off the engine.

If power of the first input shaft is transferred to the output shaft through a first gear pair mounted between the first input shaft and the output shaft when the first input shaft is operated by the engine to allow the vehicle to travel, the moving of the sleeve to connect the second input shaft to the hub gear of the output shaft may include primarily moving the sleeve such that the sleeve is gear-engaged to all of a first clutch gear fixed to a first driven gear rotatably mounted on the output shaft, the hub gear of the output shaft, and the third clutch gear of the second input shaft.

The method may further include: after the sleeve is primarily moved, secondarily moving the sleeve such that the sleeve is disconnected from the first clutch gear and is gear-engaged only to the hub gear and the third clutch gear.

When the sleeve is primarily moved, the sleeve, a first section of which has been gear-engaged to the first clutch gear and a second section of which has been gear-engaged to the hub gear, may be moved such that the first section of the sleeve is additionally gear-engaged to the hub gear while being gear-engaged to the first clutch gear, and the second section is additionally gear-engaged to the third clutch gear while being gear-engaged to the hub gear; and when the sleeve is secondarily moved, the sleeve may be moved such that the first section of the sleeve is disconnected from the first clutch gear and is gear-engaged only to the hub gear, and the second section is disconnected from the hub gear and is gear-engaged only to the third clutch gear.

If power of the first input shaft is transferred to the output shaft through a second gear pair mounted between the first input shaft and the second input shaft when the first input shaft is operated by the engine to allow the vehicle to travel, the moving of the sleeve to connect the second input shaft to the hub gear of the output shaft may include primarily moving the sleeve such that the sleeve is gear-engaged to all of a second clutch gear fixed to a second driven gear rotatably mounted on the second input shaft, the hub gear of the output shaft, and the third clutch gear of the second input shaft.

The method may further include: after the sleeve is primarily moved, secondarily moving the sleeve such that the sleeve is disconnected from the second clutch gear and is gear-engaged only to the hub gear and the third clutch gear.

When the sleeve is primarily moved, the sleeve, a first section of which has been gear-engaged to the hub gear and a second section of which has been gear-engaged to the second clutch gear, may be moved such that the first section of the sleeve is maintained to be gear-engaged to the hub gear, and the second section is additionally gear-engaged to the third clutch gear while being gear-engaged to the second clutch gear; and when the sleeve is secondarily moved, the sleeve may be moved such that the first section of the sleeve is maintained to be gear-engaged to the hub gear, and the second section is disconnected from the second clutch gear and is gear-engaged only to the third clutch gear.

The present invention can implement various modes through a comparatively simple configuration, and minimize unnecessary drag to largely enhance the fuel efficiency of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a diagram illustrating a structure of the sleeve of FIG. 1 in detail;

FIG. 3 is a table of implementable modes of the power train of FIG. 1, the table showing the positions of a sleeve with respect to a hub and clutch gears for implementation of the modes;

Figure 1:
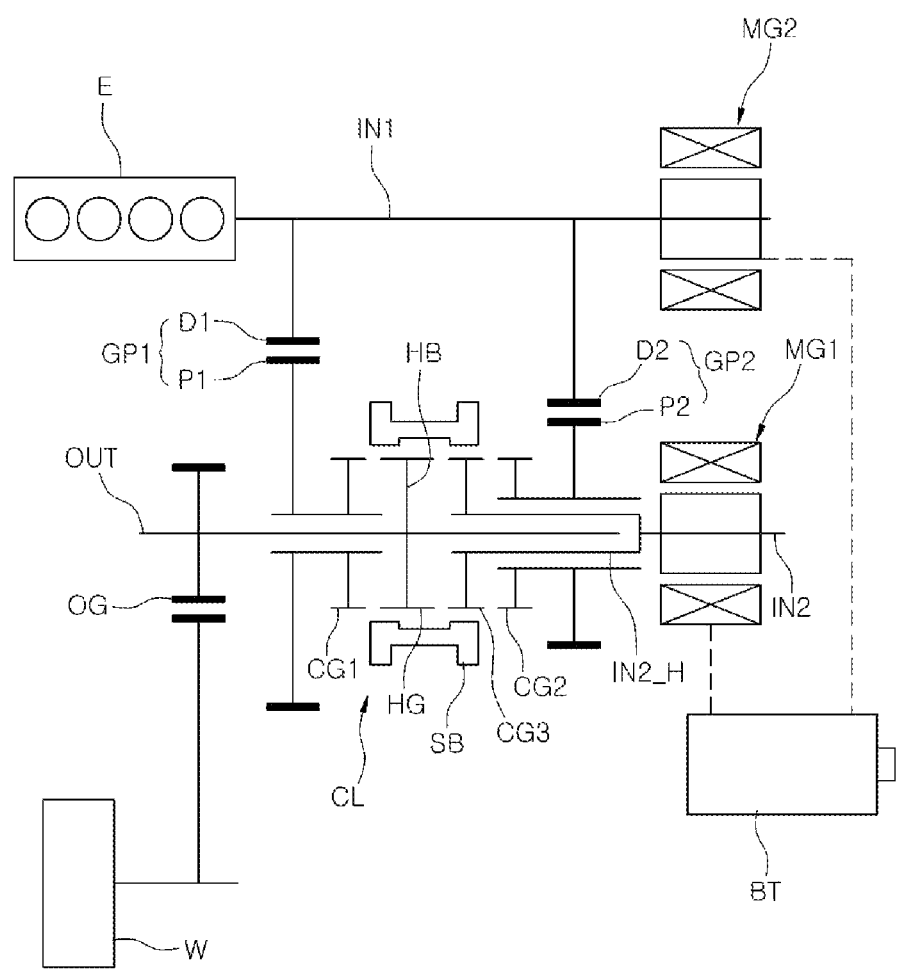
FIG. 1 is a diagram illustrating a hybrid power train of a vehicle to which various exemplary embodiments of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

As illustrated in FIG. 1, a hybrid power train of a vehicle to which various exemplary embodiments of the present invention may be applied includes: a first input shaft IN1 which receives input power; an output shaft OUT mounted to be parallel to the first input shaft IN1; a second input shaft IN2 which is mounted coaxially with the output shaft OUT and receives input power; a first gear pair GP1 and a second gear pair GP2 mounted to selectively transfer power of the first input shaft IN1 to the output shaft OUT with different gear ratios; and a clutch device CL mounted to selectively transfer, to the output shaft OUT, power transferred through the first gear pair GP1, the second gear pair GP2, and the second input shaft IN2, by a linear axial movement of the output shaft OUT.

That is, the power train is configured to allow power to be input through the first input shaft IN1 and the second input shaft IN2, and to implement various modes by which power input through the first gear pair GP1, the second gear pair GP2, and the clutch device CL may be selectively transferred to the output shaft OUT by the clutch device CL.

The first gear pair GP1 includes a first drive gear D1 fixed to the first input shaft IN1, and a first driven gear P1 which is gear-engaged to the first drive gear D1 to be rotatable about the output shaft OUT.

The second gear pair GP2 includes a second drive gear D2 fixed to the first input shaft IN1, and a second driven gear P2 which is gear-engaged to the second drive gear D2 to be rotatable about the output shaft OUT.

The gear ratio of the first gear pair GP1 is greater than that of the second gear pair GP2. Therefore, the first gear pair is configured as a relatively low gear position of a general transmission, and the second gear pair GP2 has a relatively small gear ratio and thus is configured as a high gear position accordingly.

The clutch device CL includes: a first clutch gear CG1 directly connected to the first driven gear P1; a second clutch gear CG2 directly connected to the second driven gear P2; a third clutch gear CG3 directly connected to the second input shaft IN2; a hub HB mounted on the output shaft OUT; and a sleeve SB configured to be linearly and axially movable on the hub HB.

The hub is mounted between the first clutch gear CG1 and the second clutch gear CG2, and the third clutch gear CG3 is mounted between the hub HB and the second clutch gear CG2.

The sleeve SB is gear-engaged to the hub HB while surrounding an external side of the hub. The entire axial length of a sleeve gear SG formed on an internal circumferential surface of the sleeve SB is greater than that of a hub gear HG formed on an external circumferential surface of the hub HB. The sleeve gear SG includes a first section S1 and a second section S2 in which toothed portions are formed at both sides with respect to a non-coupling section NL which excludes the toothed portions and is shorter than the axial length of the hub gear HG.

FIG. 2 illustrates the first section S1, the second section S2, and the non-coupling section NL of the sleeve SB in detail.

The power train is configured to implement five driving modes, as shown in FIG. 3, according to axial movements of the sleeve SB. The five modes are implemented as below. In the first mode, among the first section S1 and the second section S2 of the sleeve gear SG, the first section S1 is gear-engaged to the first clutch gear CG1, and the second section S2 is gear-engaged to the hub gear HG. In the second mode, the first section S1 is gear-engaged to the hub gear HG, and the second section S2 is gear-engaged to the second clutch gear CG2. In the third mode, the first section S1 is gear-engaged to the hub gear HG, and the second section S2 is gear-engaged to the third clutch gear CG3. In the fourth mode, the first section S1 is gear-engaged to the first clutch gear CG1 and the hub gear HG, and the second section S2 is gear-engaged to the hub gear HG and the third clutch gear CG3. In the fifth mode, the first section S1 is gear-engaged to the hub gear HG, and the second section S2 is gear-engaged to the second clutch gear CG2 and the third clutch gear CG3.

Furthermore, in the power train, the third clutch gear CG3 is coupled to an end portion of the second input shaft IN2 including a hollow portion IN2_H covering one end portion of the output shaft OUT.

Furthermore, the second driven gear P2 and the second clutch gear CG2 are rotatably mounted on an external side of the hollow portion IN2_H of the second input shaft IN2, so that the second driven gear and the second clutch gear can rotate about the output shaft OUT.

The first input shaft IN1 is connected to an engine E to receive power of the engine E, and the second input shaft IN2 is connected to a first motor-generator MG1.

Furthermore, a series-type hybrid power train may be configured such that a second motor-generator MG2 is additionally connected to the first input shaft IN1, and an electrical device operates the first motor-generator MG1 by use of power generated from the second motor-generator MG2.

The electrical device naturally includes an inverter, a battery, etc. FIG. 1 illustrates a battery BT representatively.

Figure 4:
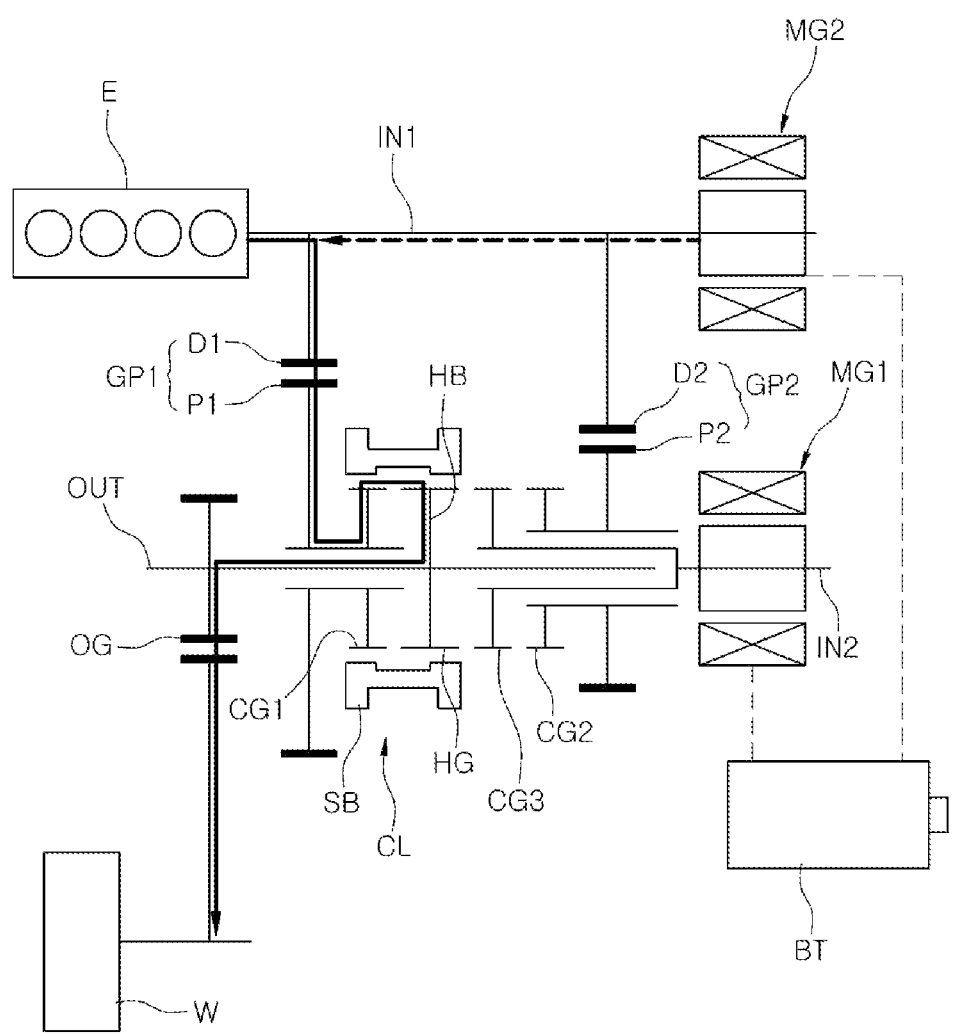
FIG. 4, FIG. 5, FIG. 6, FIG. 7 and FIG. 8 are diagrams illustrating a first mode to a fifth mode, respectively.

FIG. 4 illustrates the first mode implemented by the power train. In the first mode, the first section S1 of the sleeve gear SG is gear-engaged to the first clutch gear CG1, the second section S2 is gear-engaged to the hub gear HG, and thus power of the first input shaft IN1 is transferred to the sleeve SB and the hub HB through the first gear pair GP1 and is thus provided to the output shaft OUT. The first mode implements a first gear position state.

Power of the engine E is basically provided to the first input shaft IN1, and the second motor-generator MG2 may selectively provide power thereto.

For reference, in FIG. 4, FIG. 5, FIG. 6, FIG. 7, and FIG. 8, the dotted arrows indicate selective power flows, and the solid arrows indicate essential power flows.

For reference, the output shaft OUT includes an output gear OG to take off power to a driving wheel W.

Figure 5:
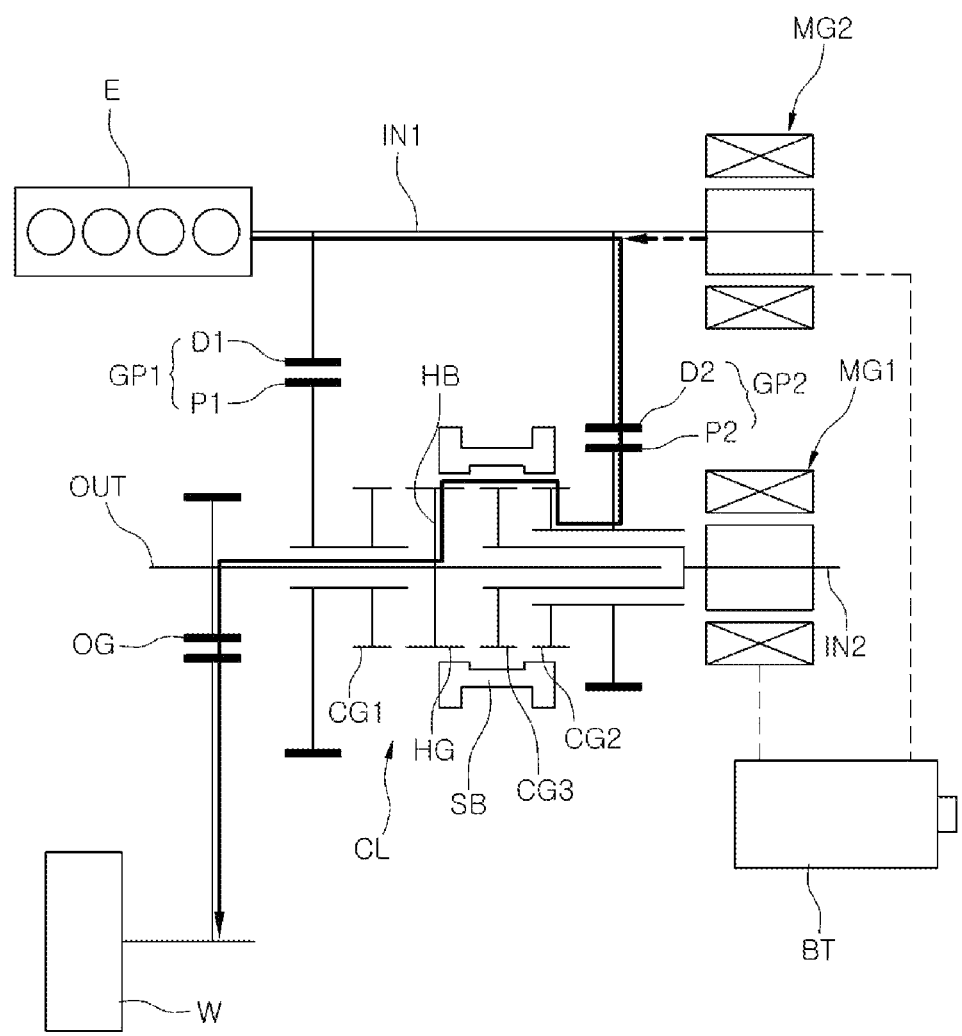

FIG. 5 illustrates the second mode in which the first section S1 of the sleeve gear SG is gear-engaged to the hub gear HG, and the second section S2 is gear-engaged to the second clutch gear CG2. In the second mode, power of the first input shaft IN1 is transferred to the output shaft OUT through the second gear pair GP2, so that a second gear position state is implemented.

Similarly, power of the engine E is essentially provided to the first input shaft IN1, and power of the second motor-generator MG2 may be selectively provided to supplement the power of the engine E.

Figure 6:
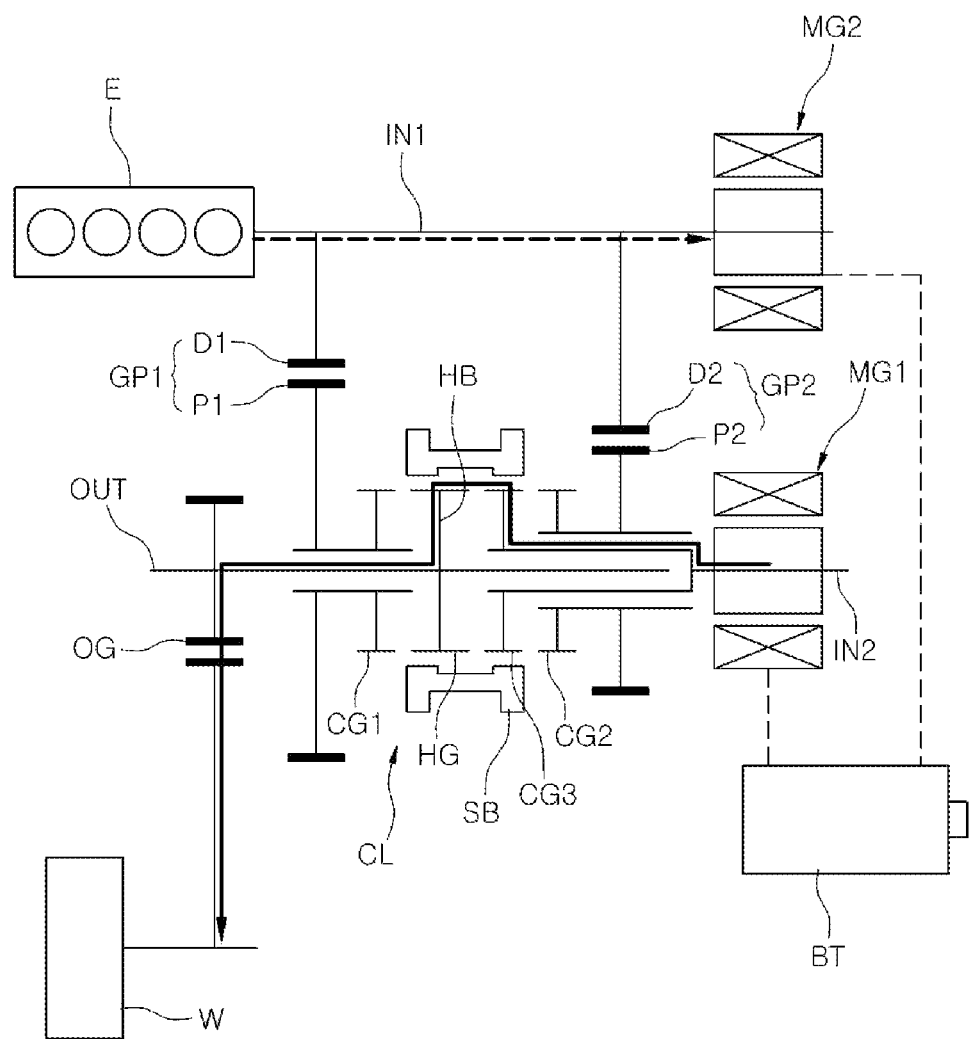

FIG. 6 illustrates the third mode in which the first section S1 of the sleeve gear SG is gear-engaged to the hub gear HG, and the second section S2 is gear-engaged to the third clutch gear CG3.

Therefore, power of the first motor-generator MG1 is transferred to the output shaft OUT through the second input shaft IN2, the third clutch gear CG3, the sleeve SB, and the hub HB, so that an EV mode in which the vehicle is operated only by the first motor-generator MG1 is implemented.

Meanwhile, FIG. 6 illustrates the engine E which is operated together in addition to the first motor-generator MG1, so that the first motor-generator MG1 may be operated by electricity generated by operating the second motor-generator MG2 with power of the engine E. The configuration described above may be considered to be implementation of a so-called series-type hybrid mode.

Figure 7:
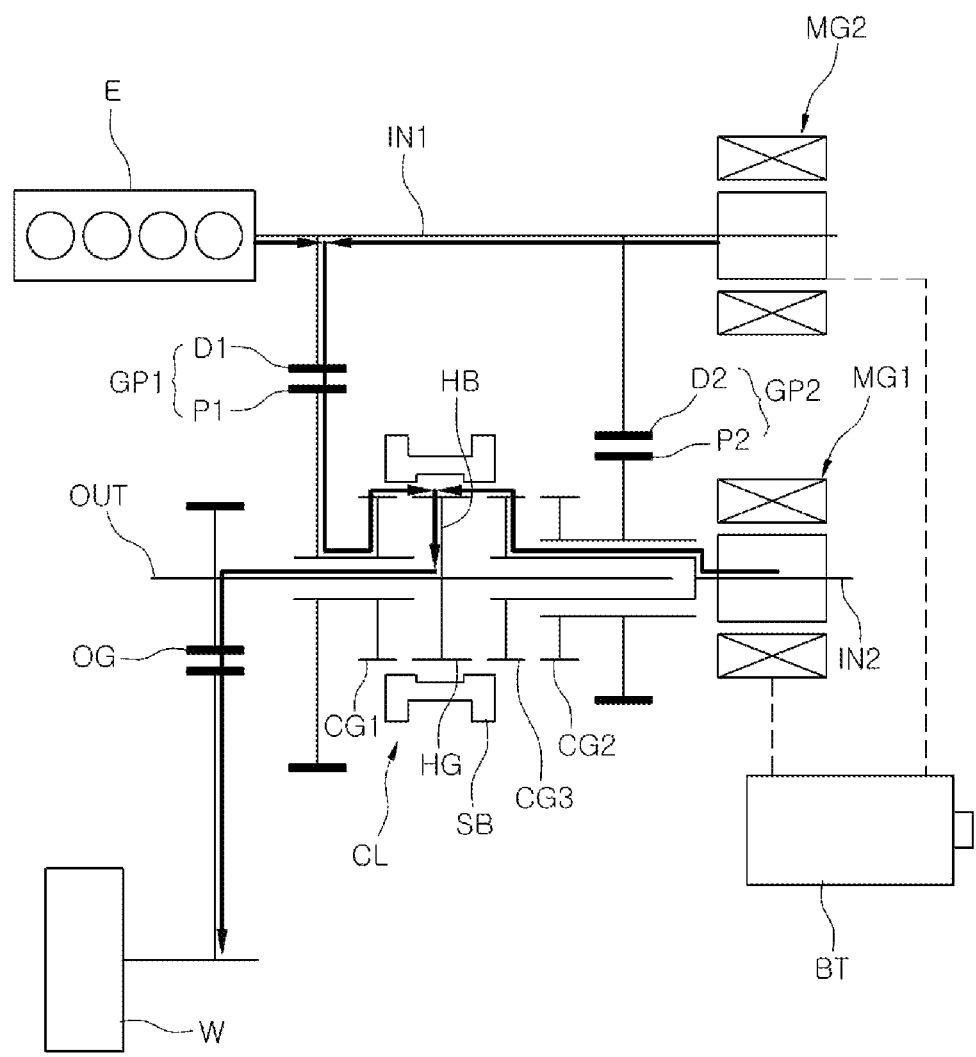

In the fourth mode illustrated in FIG. 7, the first section S1 of the sleeve gear SG is gear-engaged to the first clutch gear CG1 and the hub gear HG, and the second section S2 is gear-engaged to the hub gear HG and the third clutch gear CG3. That is, in the fourth mode, the first clutch gear CG1, the hub HB, and the third clutch gear CG3 are connected to each other by the sleeve SB.

Therefore, power of the engine E is transferred to the hub HB through the first gear pair GP1 and the first clutch gear CG1, and power of the first motor-generator MG1 is transferred to the hub HB through the third clutch gear CG3, so that the output shaft OUT is operated by both the power of the engine E and the power of the first motor-generator MG1. A so-called parallel-type hybrid mode is implemented by the configuration described above.

Figure 8:
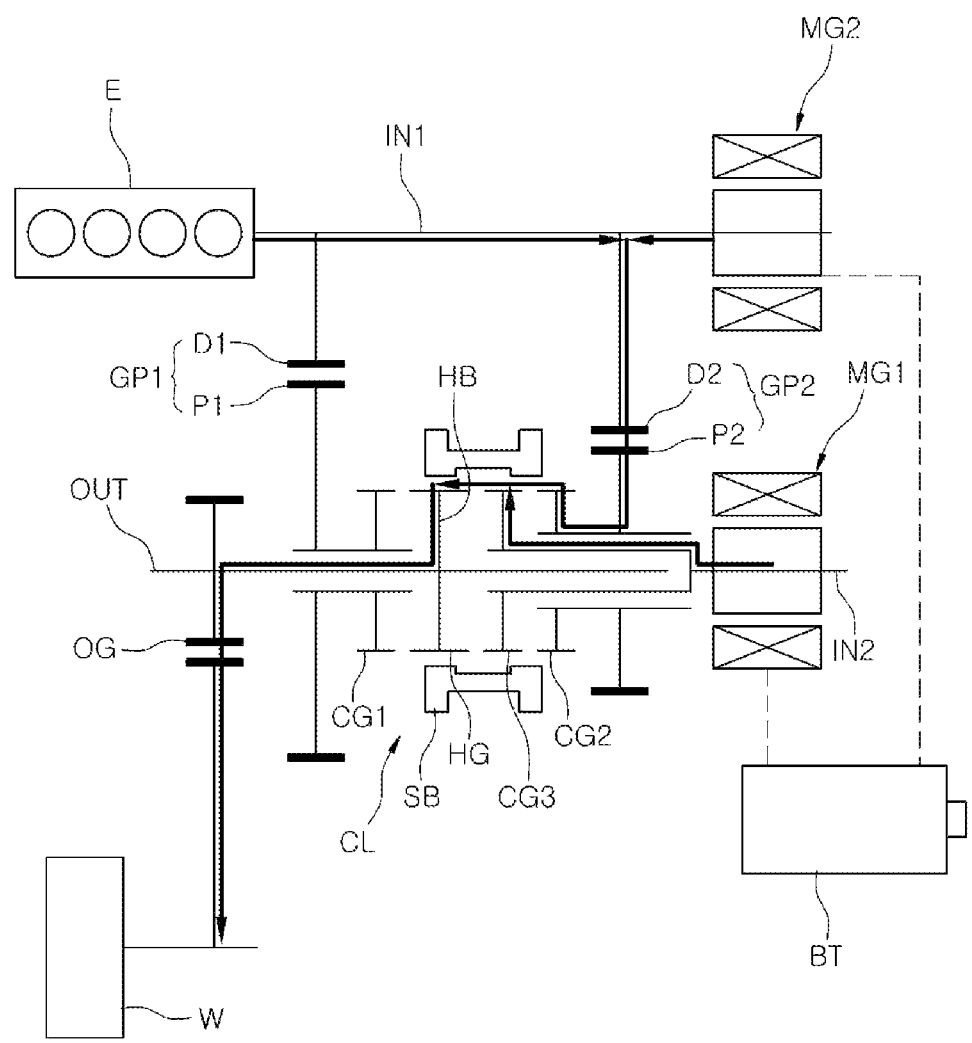

In the fifth mode illustrated in FIG. 8, the first section S1 of the sleeve gear SG is gear-engaged to the hub gear HG, and the second section S2 is gear-engaged to the second clutch gear CG2 and the third clutch gear CG3. That is, in the fifth mode, the second clutch gear CG2 and the third clutch gear CG3 are both connected to the hub HB by the sleeve SB.

Therefore, power of the engine E is transferred to the hub HB through the second gear pair GP2 and the second clutch gear CG2, and power of the first motor-generator MG1 is transferred to the hub HB through the third clutch gear CG3, so that the output shaft OUT is operated by both the power of the engine E and the power of the first motor-generator MG1. Another parallel-type hybrid mode is implemented by the configuration described above.

That is, the power train may selectively implement a parallel-type hybrid mode such that power of the engine E is switched into the speed corresponding to the first gear position as in the fourth mode, or power of the engine E is switched into the speed corresponding to the second gear position as in the fifth mode. Therefore, the vehicle may be operated in the parallel-type hybrid mode while the speed change between the first gear position and the second gear position are possible, and through the configuration, a proper gear position may be selected such that the engine E is operated at an operating point which is more advantageous in terms of the fuel efficiency. Ultimately, the fuel efficiency of the vehicle may be more enhanced.

Figure 9:
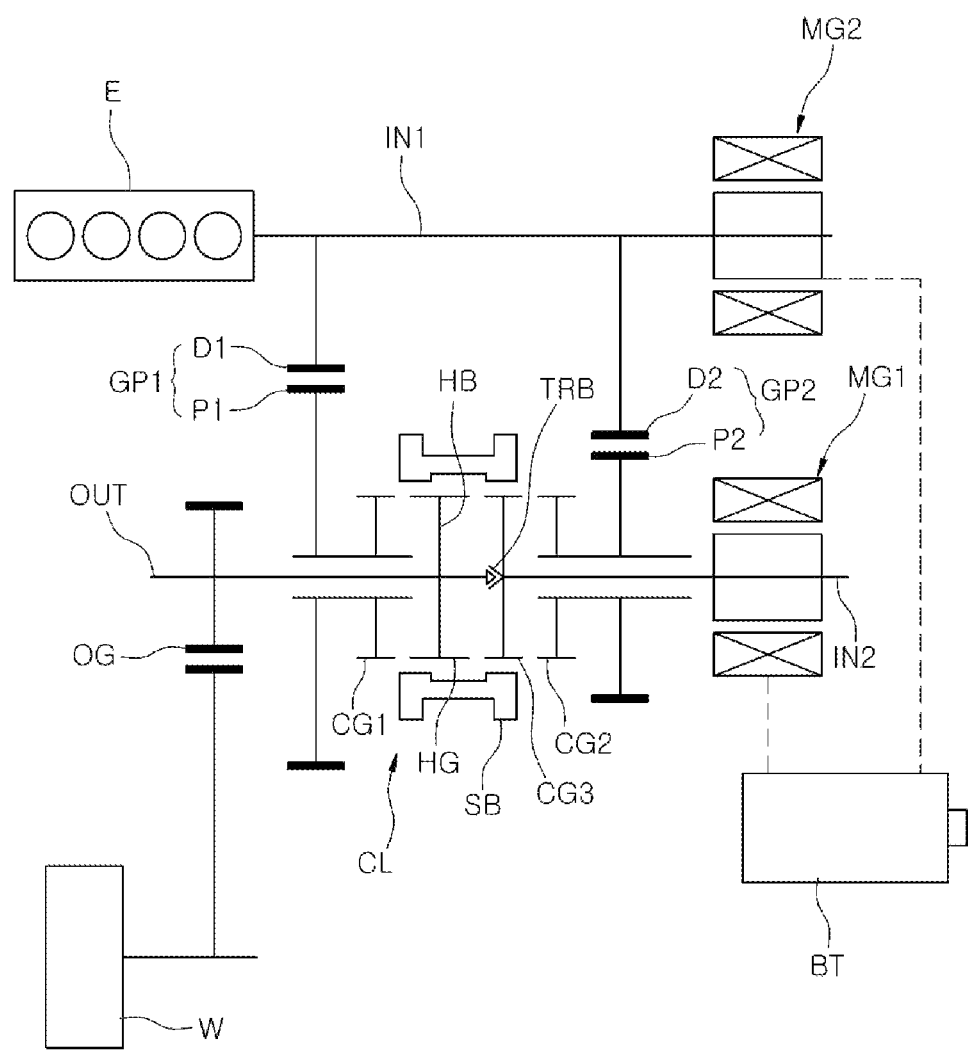
FIG. 9 is a diagram illustrating a modification of the hybrid power train of FIG. 1.

Meanwhile, FIG. 9 illustrates a modification of the power train of FIG. 1. The power train of FIG. 9 includes: a first input shaft IN1 and a second input shaft IN2 mounted to be parallel to each other to receive power; an output shaft OUT mounted coaxially with the second input shaft IN2; a first gear pair GP1 including gears which are externally gear-engaged to each other and mounted on the first input shaft IN1 and the output shaft OUT, respectively; a second gear pair GP2 including gears which are externally gear-engaged to each other and mounted on the first input shaft IN1 and the second input shaft IN2, respectively; and a clutch device CL provided to selectively implement a state in which power from the first input shaft IN1 may be transferred to the output shaft OUT through the first gear pair GP1 or the second gear pair GP2, or a state in which power of the second input shaft IN2 may be transferred to the output shaft OUT.

That is, the basic configuration of the power train is almost the same as the power train of FIG. 1. However, the power train of FIG. 9 differs from the power train of FIG. 1 only in that a hollow portion is not included in the second input shaft IN2, a second driven gear P2 included in the second gear pair GP2 is rotatably mounted on the second input shaft IN2, and an end portion of the output shaft OUT and an end portion of the second input shaft IN2 are supported by a tapered roller bearing TRB supporting a radial load and an axial load together, as described below.

The first gear pair GP1 includes: a first drive gear D1, the rotation of which is restrained by the first input shaft IN1; and a first driven gear P1 rotatably mounted on the output shaft OUT. The second gear pair GP2 includes: a second drive gear D2, the rotation of which is restrained by the first input shaft IN1; and a second driven gear P2 rotatably mounted on the second input shaft IN2.

The clutch device CL includes: a first clutch gear CG1 connected to the first driven gear P1; a second clutch gear CG2 connected to the second driven gear P2; a third clutch gear CG3 connected to the second input shaft IN2; a hub HB mounted on the output shaft OUT such that the rotation of the hub is restrained; and a sleeve SB mounted such that the sleeve may be gear-engaged to at least one of the first clutch gear CG1, the second clutch gear CG2, and the third clutch gear CG3 while moving on the hub HB according to an axial direction thereof.

The first clutch gear CG1, the hub HB, the third clutch gear CG3, and the second clutch gear CG2 are sequentially mounted according to the axial direction of the output shaft OUT.

The sleeve SB is gear-engaged to an external side of the hub HB such that the rotation of sleeve is restrained, and a linear slide along the output shaft OUT is allowed. A sleeve gear SG which is gear-engaged to the hub HB is formed on an internal circumferential surface of the sleeve SB. The sleeve gear SG includes a first section S1 and a second section S2 in which toothed portions are formed at both sides of the sleeve gear, and includes a non-coupling section NL which excludes the toothed portions and is mounted between the first section S1 and the second section S2. The entire axial length of the first section S1, the non-coupling section NL, and the second section S2 of the sleeve gear SG is greater than the axial length of a hub gear HG formed on an external circumferential surface of the hub HB. The non-coupling section NL of the sleeve gear SG is shorter than the axial length of the hub gear HG. Therefore, in the entire section in which the sleeve gear SG moves in the axial direction thereof, at least one of the first section S1 and the second section S2 is maintained to be gear-engaged to the hub gear HG.

The first section S1 and the second section S2 of the sleeve gear SG are configured to implement: a first mode in which the first section S1 is gear-engaged to the first clutch gear CG1, and the second section S2 is gear-engaged to the hub gear HG; a second mode in which the first section S1 is gear-engaged to the hub gear HG, and the second section S2 is gear-engaged to the second clutch gear CG2; a third mode in which the first section S1 is gear-engaged to the hub gear HG, and the second section S2 is gear-engaged to the third clutch gear CG3; a fourth mode in which the first section S1 is gear-engaged to the first clutch gear CG1 and the hub gear HG, and the second section S2 is gear-engaged to the hub gear HG and the third clutch gear CG3; and a fifth mode in which the first section S1 is gear-engaged to the hub gear HG, and the second section S2 is gear-engaged to the second clutch gear CG2 and the third clutch gear CG3.

The third clutch gear CG3 is coupled to the end portion of the second input shaft IN2, and the end portion of the output shaft OUT is supported by the tapered roller bearing TRB supporting a radial load and an axial load at the end portion of the second input shaft IN2.

Therefore, the structure of the second input shaft IN2 may be simplified and the weight there may be reduced compared to the power train of FIG. 1. Furthermore, the internal diameter and the external diameter of the second driven gear P2 may be reduced, so that the degree of freedom for a design related to the second gear ratio may be increased.

The first input shaft IN1 is connected to an engine E, and the second input shaft IN2 is connected to a first motor-generator MG1.

A power train of a vehicle may be configured by only the elements described above. However, it is possible to further connect a second motor-generator MG2 to the first input shaft IN1 to implement a series-type hybrid mode as described above.

Figure 10:
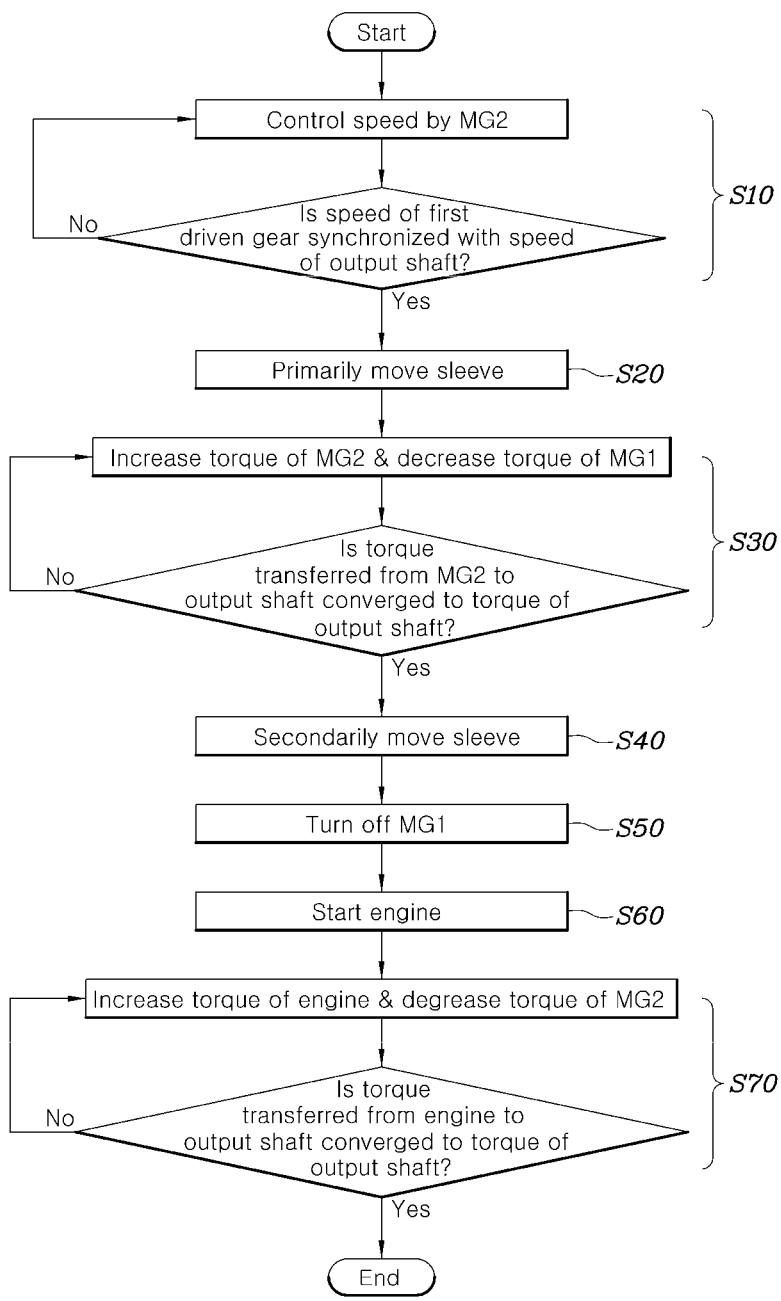
FIG. 10 is a flowchart of the various exemplary embodiments of a control method of a hybrid power train of a vehicle according to various exemplary embodiments of the present invention.
Figure 14:
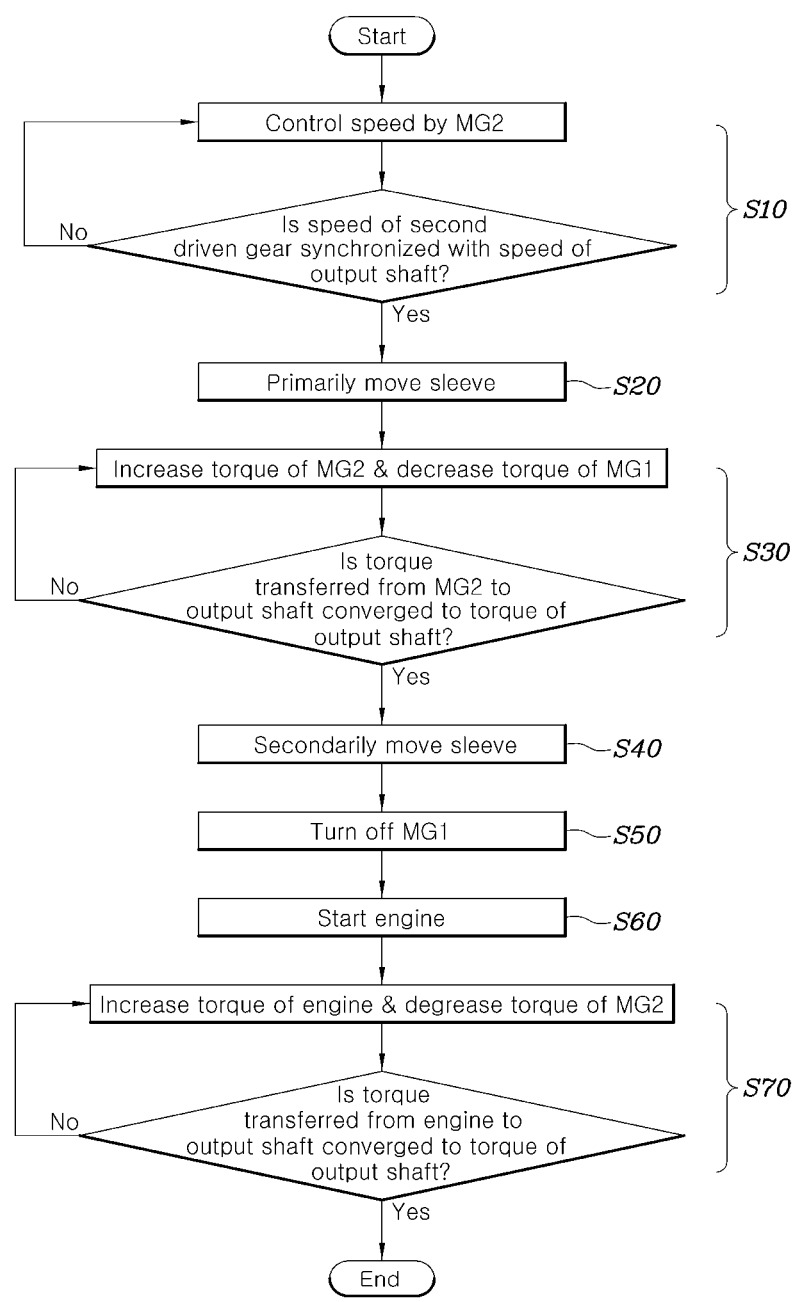
FIG. 14 is a flowchart of the various exemplary embodiments of a control method of a hybrid power train of a vehicle according to various exemplary embodiments of the present invention.

FIGS. 10 and 14 illustrate the various exemplary embodiments of a method for controlling a hybrid power train of a vehicle according to various exemplary embodiments of the present invention. The exemplary embodiments commonly include: while a second input shaft IN2 is operated by a first motor-generator MG1 to allow the vehicle to travel in an electric vehicle (EV) mode, driving a first input shaft IN1 by a second motor-generator MG2 to synchronize a speed of a driven gear of a target gear position with a speed of an output shaft (S10); primarily moving a sleeve SB to directly connect the second input shaft IN2, the output shaft OUT, and the driven gear of the target gear position (S20); decreasing torque of the first motor-generator MG1 and increasing torque of the second motor-generator MG2 to converge torque transferred from the second motor-generator MG2 to the output shaft OUT, to torque of the output shaft (S30); secondarily moving the sleeve SB to release the second input shaft IN2 and maintain only the output shaft OUT and the driven gear of the target gear position to be directly connected (S40); and increasing torque of an engine and decreasing the torque of the second motor-generator MG2 to converge torque transferred from the engine to the output shaft OUT, to the torque of the output shaft OUT (S70).

That is, the various exemplary embodiments of FIG. 10 corresponds to a method for controlling the power trains to change speed from the EV mode, which is the third mode, to the first gear position, which is the first mode. The various exemplary embodiments of FIG. 14 corresponds to a method for controlling the power trains to change speed from the EV mode to the second gear position, which is the second mode. Therefore, the various exemplary embodiments of FIG. 10 and the various exemplary embodiments of FIG. 14 have a common feature in that the exemplary embodiments correspond to control methods for changing speed from the EV mode to the first or second gear position, which is operated by the engine.

The various exemplary embodiments of FIG. 10 and the various exemplary embodiments of FIG. 14 include: turning off the first motor-generator MG1 (S50) after secondarily moving the sleeve SB to release the second input shaft IN2 from the output shaft OUT. Therefore, unnecessary power consumption may be prevented.

The various exemplary embodiments of FIG. 10 and the various exemplary embodiments of FIG. 14 naturally include: starting the engine (S60) before converging the torque transferred from the engine to the output shaft OUT, to the torque of the output shaft (S70). Therefore, the engine may be provided in advance to increase the torque as described above.

if the torque which has been provided from the first motor-generator MG1 and has been applied to the output shaft OUT is referred to as "the torque of the output shaft", the converging of the torque transferred from the second motor-generator MG2 to the output shaft OUT, to the torque of the output shaft (S30) implies gradually decreasing the torque provided from the first motor-generator MG1 to the output shaft OUT and gradually increasing the torque provided from the second motor-generator MG2 to the output shaft OUT, to allow the torque provided from the second motor-generator MG2 to the output shaft OUT, to ultimately reach "the torque of the output shaft".

Figure 11:
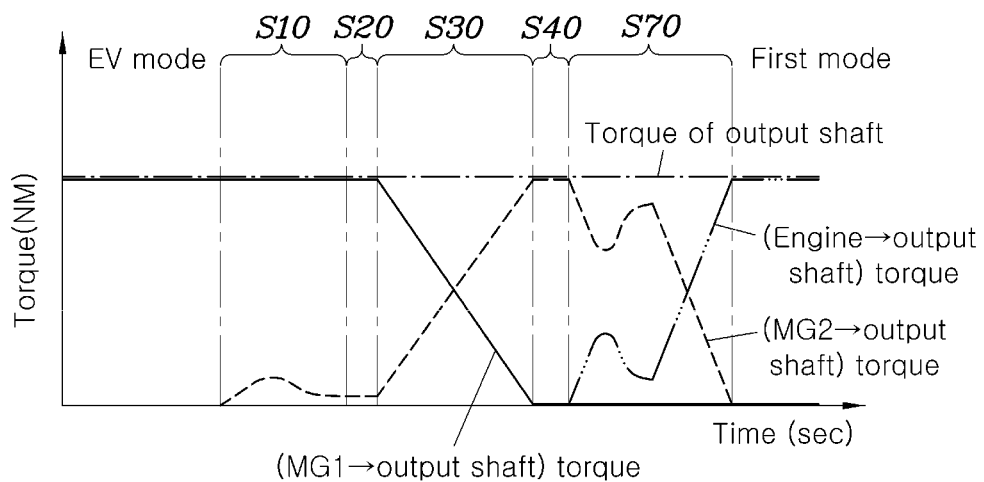
FIG. 11 is a graph showing changes in torque according to the various exemplary embodiments of FIG. 10.
Figure 12:
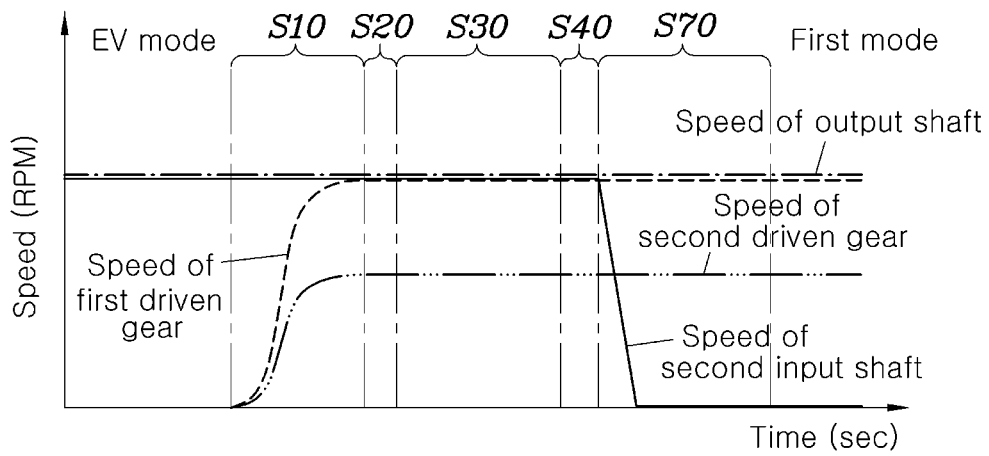
FIG. 12 is a graph showing changes in speed according to the various exemplary embodiments of FIG. 10.
Figure 13:
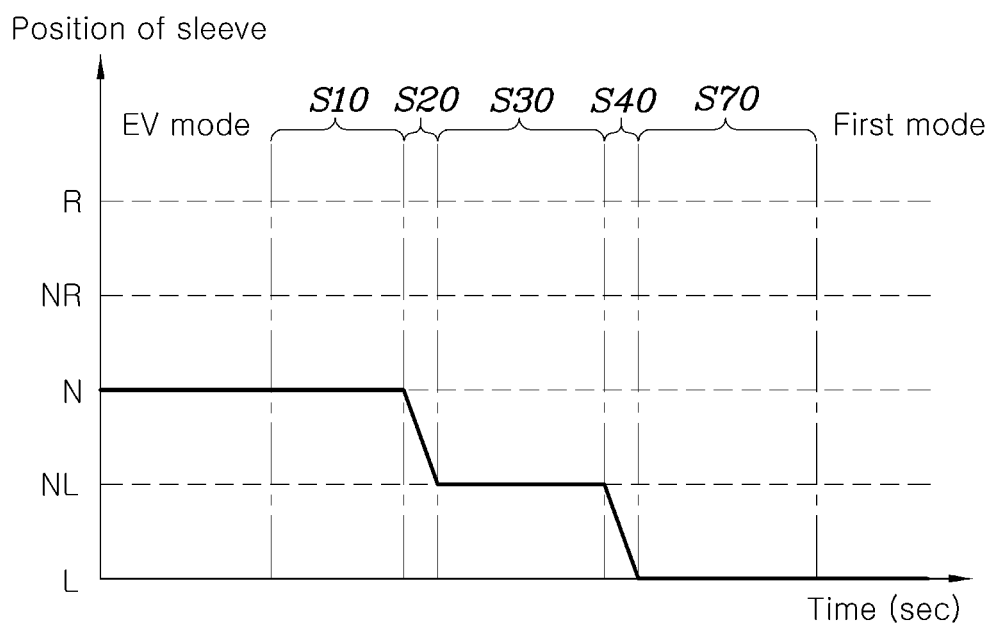
FIG. 13 is a graph showing changes in the position of a sleeve according to the various exemplary embodiments of FIG. 10.
Figure 15:
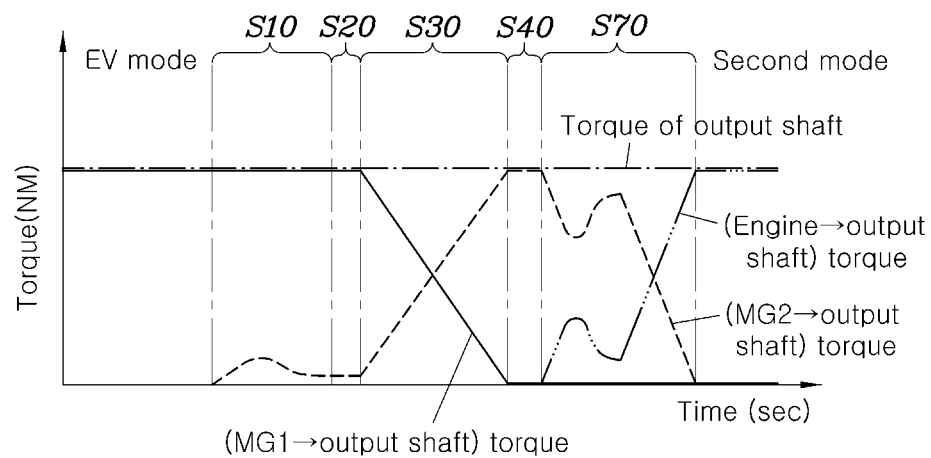
FIG. 15 is a graph showing changes in torque according to the various exemplary embodiments of FIG. 14.
Figure 16:
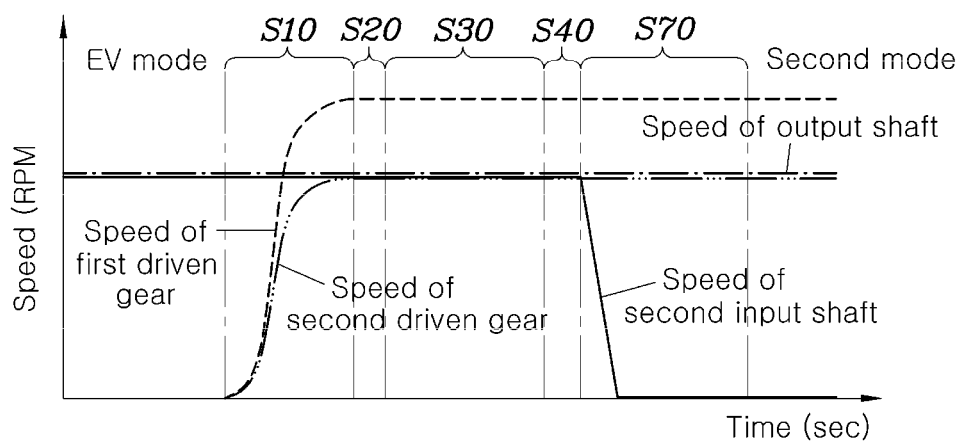
FIG. 16 is a graph showing changes in speed according to the various exemplary embodiments of FIG. 14.
Figure 17:
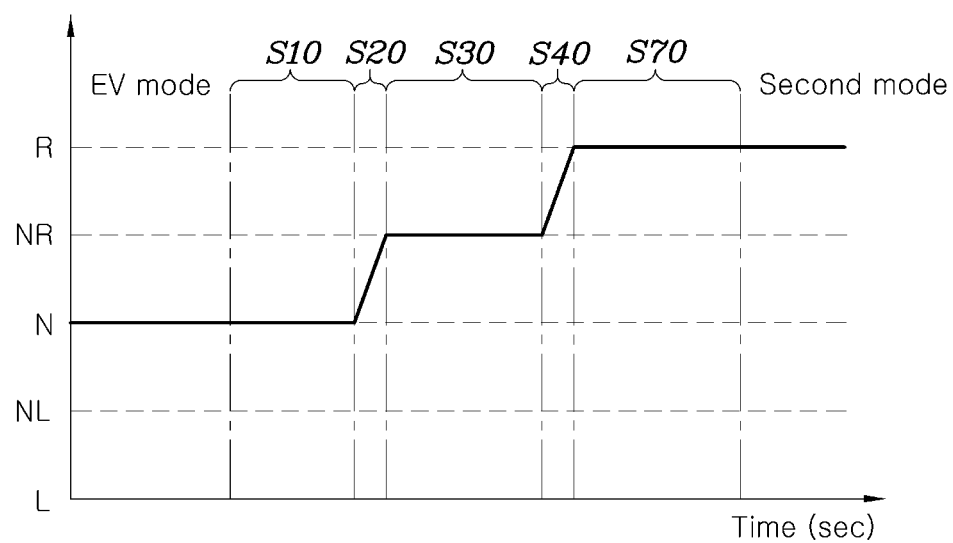
FIG. 17 is a graph showing changes in the position of a sleeve according to the various exemplary embodiments of FIG. 14.

Therefore, in the converging of the torque transferred from the second motor-generator MG2 to the output shaft OUT, to the torque of the output shaft (S30), the sum of the torque transferred from the first motor-generator MG1 to the output shaft OUT and the torque transferred from the second motor-generator MG2 to the output shaft OUT is conceptually controlled to continuously remain the same. See S30 in FIGS. 11 and 15.

Furthermore, in the converging of the torque transferred from the engine to the output shaft OUT, to the torque of the output shaft (S70), the torque is also controlled according to a concept similar to the concept described above. If the torque which has been provided to the output shaft OUT by the second motor-generator MG2 is referred to as "the torque of the output shaft", operation S70 also implies gradually decreasing the torque provided from the second motor-generator MG2 to the output shaft OUT and gradually increasing the torque provided from the engine to the output shaft OUT, to allow the torque provided from the engine to the output shaft OUT, to ultimately reach "the torque of the output shaft".

Therefore, in operation S70, the sum of the torque transferred from the second motor-generator MG2 to the output shaft OUT and the torque transferred from the engine to the output shaft OUT is conceptually controlled to continuously remain the same. See S70 in FIGS. 11 and 15.

For reference, each operation described above may be performed by a controller mounted in the vehicle, and the controller may be configured by a plurality of controllers, or an integrated single controller.

If the target gear position is the first gear position, that is, corresponds to the various exemplary embodiments of the present invention in FIG. 10, the primary moving of the sleeve SB (S20) includes moving the sleeve SB, which has been gear-engaged only to a third clutch gear CG3 of the second input shaft IN2 and a hub gear HG of the output shaft OUT such that the sleeve is additionally gear-engaged to a first clutch gear CG1 integrally connected to the first driven gear P1.

That is, in the primary moving of the sleeve SB (S20), the sleeve SB, the first section S1 of which has been gear-engaged to the hub gear HG and the second section S2 of which has been gear-engaged to the third clutch gear CG3, is moved such that the first section S1 of the sleeve SB is additionally gear-engaged to the first clutch gear CG1 while being gear-engaged to the hub gear HG, and the second section S2 of the sleeve SB is additionally gear-engaged to the hub gear HG while being gear-engaged to the third clutch gear CG3. Therefore, the power train enters into a three-shaft direct connection state as the fourth mode.

Next, in the secondary moving of the sleeve SB (S40), the sleeve SB is further moved such that the first section S1 of the sleeve SB is disconnected from the hub gear HG and is gear-engaged only to the first clutch gear CG1, and the second section S2 of the sleeve SB is disconnected from the third clutch gear CG3 and is gear-engaged only to the hub gear HG. Therefore, the first mode is implemented.

If the target gear position is the second gear position, that is, corresponds to the various exemplary embodiments of the present invention in FIG. 14, the primary moving of the sleeve SB (S20) includes moving the sleeve SB, which has been gear-engaged only to a third clutch gear CG3 of the second input shaft IN2 and a hub gear HG of the output shaft OUT such that the sleeve is additionally gear-engaged to a second clutch gear CG2 integrally connected to the second driven gear P2.

That is, in the primary moving of the sleeve SB (S20), the sleeve SB, the first section S1 of which has been gear-engaged to the hub gear HG and the second section S2 of which has been gear-engaged to the third clutch gear CG3, is moved such that the first section S1 of the sleeve SB is maintained to be gear-engaged to the hub gear HG, and the second section S2 of the sleeve SB is additionally gear-engaged to the second clutch gear CG2 while being gear-engaged to the third clutch gear CG3. Therefore, the power train enters into a three-shaft direct connection state as the fifth mode.

Next, in the secondary moving of the sleeve SB (S40), the sleeve SB is moved such that the first section S1 of the sleeve SB is maintained to be gear-engaged to the hub gear HG, and the second section S2 of the sleeve SB is disconnected from the third clutch gear CG3 and is gear-engaged only to the second clutch gear CG2. Therefore, the second mode is implemented.

Figure 18:
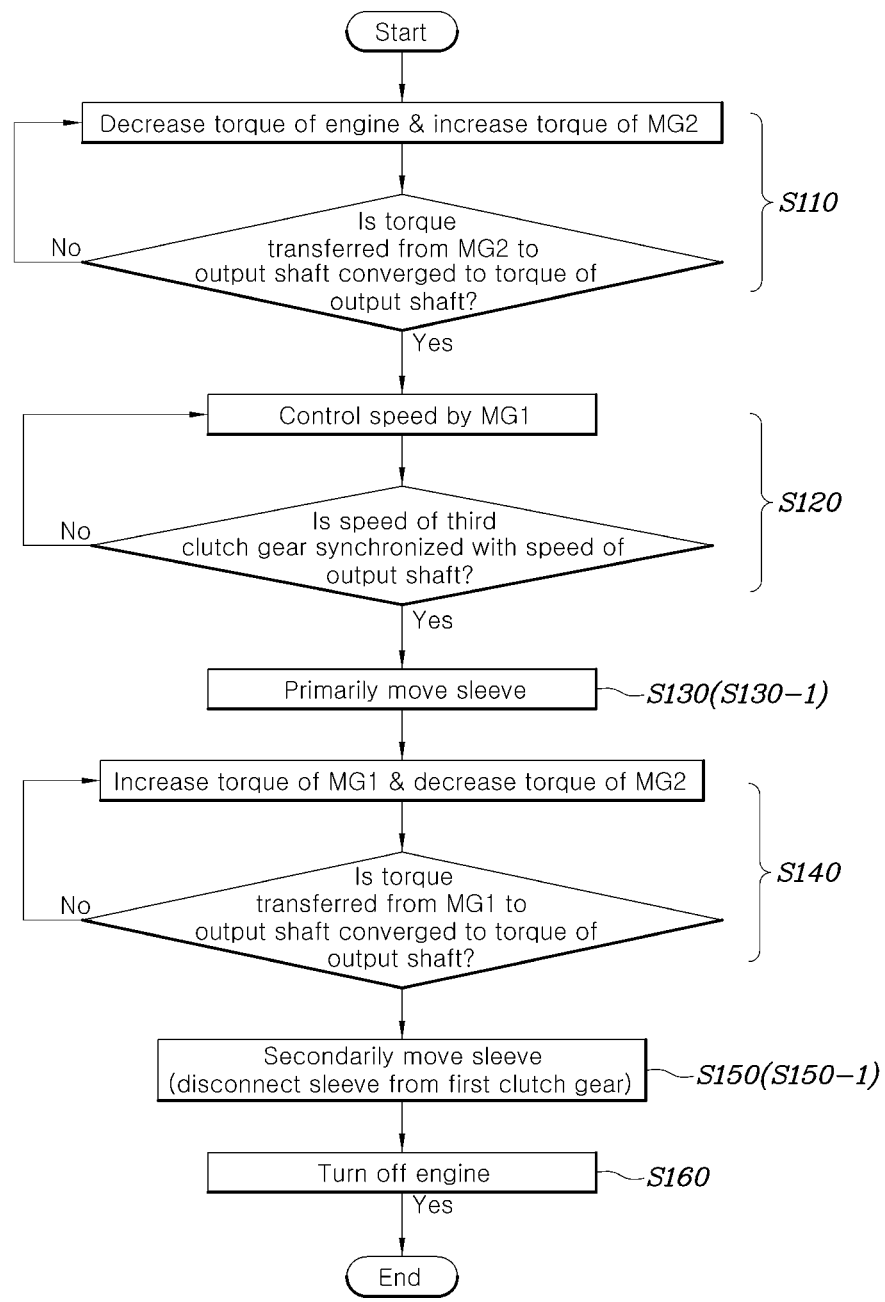
FIG. 18 is a flowchart of the various exemplary embodiments of a control method of a hybrid power train of a vehicle according to various exemplary embodiments of the present invention.
Figure 22:
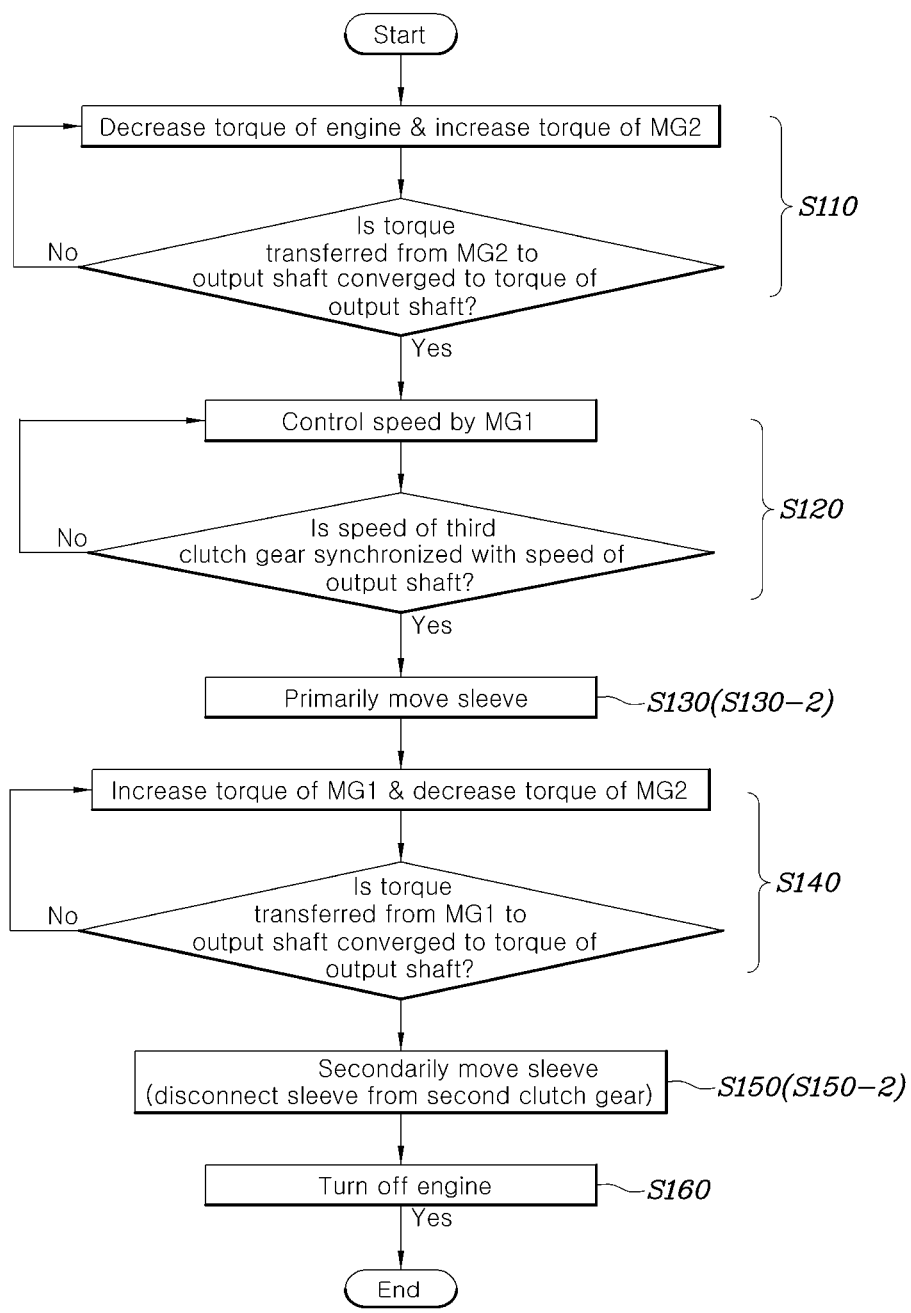
FIG. 22 is a flowchart of the various exemplary embodiments of a control method of a hybrid power train of a vehicle according to various exemplary embodiments of the present invention.

FIGS. 18 and 22 illustrate various exemplary embodiments of a method for controlling a hybrid power train of a vehicle according to various exemplary embodiments of the present invention. The exemplary embodiments commonly include: while a first input shaft IN1 is operated by an engine to allow the vehicle to travel, decreasing torque of the engine and increasing torque of a second motor-generator MG2 to converge torque transferred from the second motor-generator MG2 to an output shaft OUT, to torque of the output shaft (S110); driving a second input shaft IN2 by a first motor-generator MG1 to synchronize a speed of a third clutch gear CG3 with a speed of the output shaft OUT (S120); moving a sleeve SB to connect the second input shaft IN2 to a hub gear HG of the output shaft OUT (S130); and increasing torque of the first motor-generator MG1 and decreasing the torque of the second motor-generator MG2 to converge the torque of the first motor-generator MG1 to the torque of the output shaft (S140).

That is, the various exemplary embodiments of FIG. 18 and the various exemplary embodiments of FIG. 22 correspond to control methods for performing speed change control from the first gear position, which is the first mode, or the second gear position, which is the second mode, to the EV mode, which is the third mode.

In the exemplary embodiments of the present invention, after the torque transferred from the second motor-generator MG2 to the output shaft OUT has been converged to the torque of the output shaft, the engine may be turned off to prevent the consumption of fuel.

A time point of turning off the engine may be any time after the torque transferred from the second motor-generator MG2 to the output shaft OUT has been converged to the torque of the output shaft, as described above. However, in consideration of drag which occurs in a state where the engine has been turned off, the engine may be turned off (S160) after the sleeve SB is secondarily moved, as illustrated in FIGS. 18 and 22.

If the torque which has been provided from the engine and has been applied to the output shaft OUT before the converging of operation S110 is referred to as "the torque of the output shaft", the converging of the torque transferred from the second motor-generator MG2 to the output shaft OUT, to the torque of the output shaft (S110) implies gradually decreasing the torque provided from the engine to the output shaft OUT and gradually increasing the torque provided from the second motor-generator MG2 to the output shaft OUT, to allow the torque provided from the second motor-generator MG2 to the output shaft OUT, to ultimately reach "the torque of the output shaft".

Figure 19:
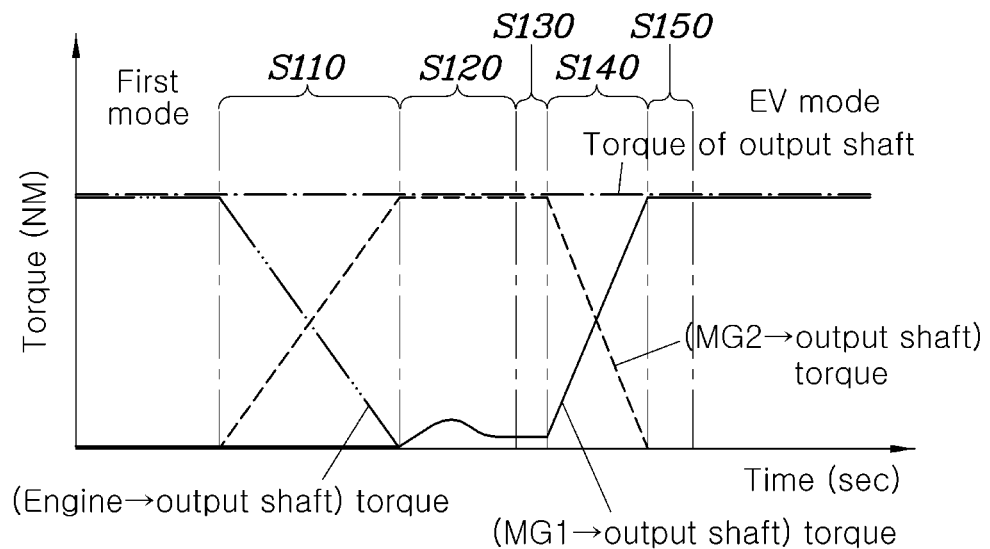
FIG. 19 is a graph showing changes in torque according to the various exemplary embodiments of FIG. 18.
Figure 20:
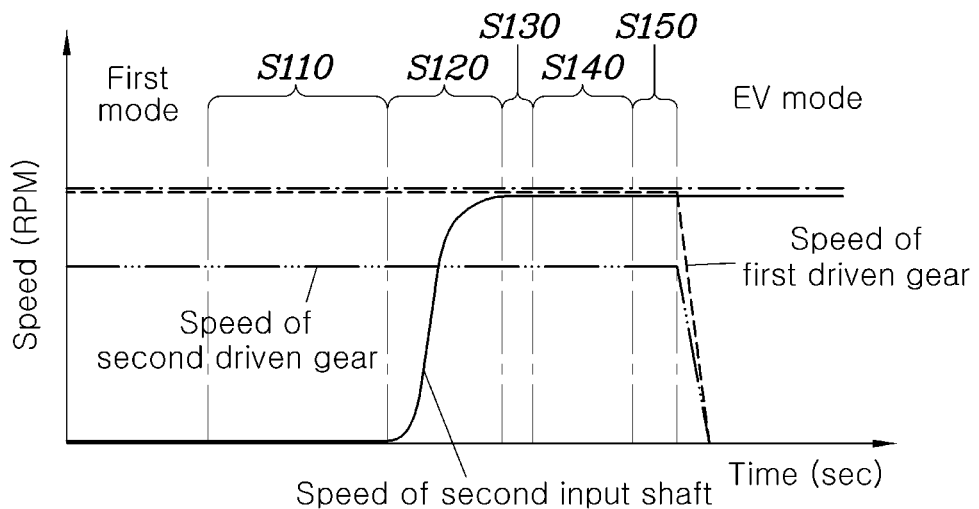
FIG. 20 is a graph showing changes in speed according to the various exemplary embodiments of FIG. 18.
Figure 21:
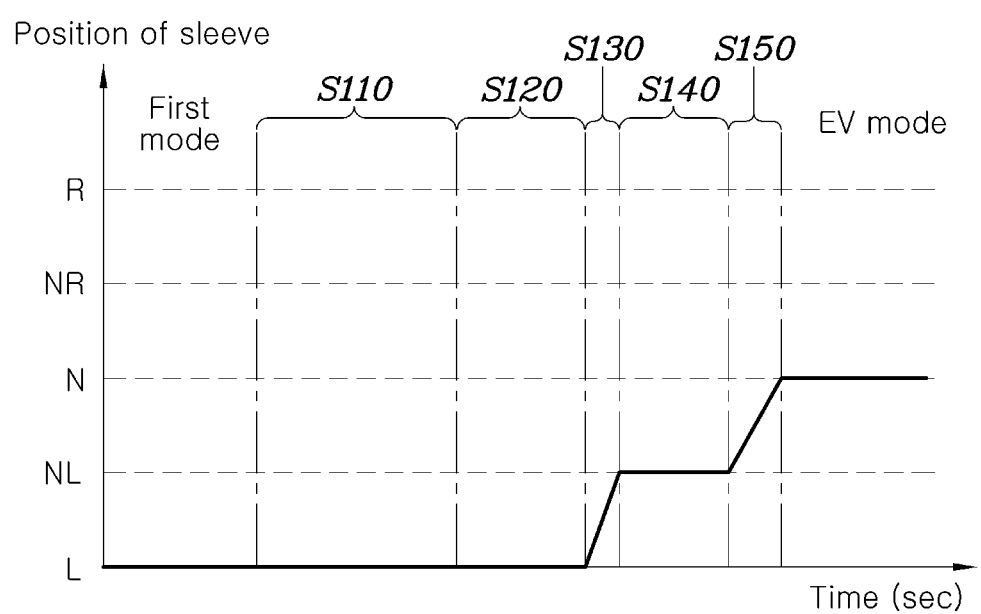
FIG. 21 is a graph showing changes in the position of a sleeve according to the various exemplary embodiments of FIG. 18.
Figure 23:
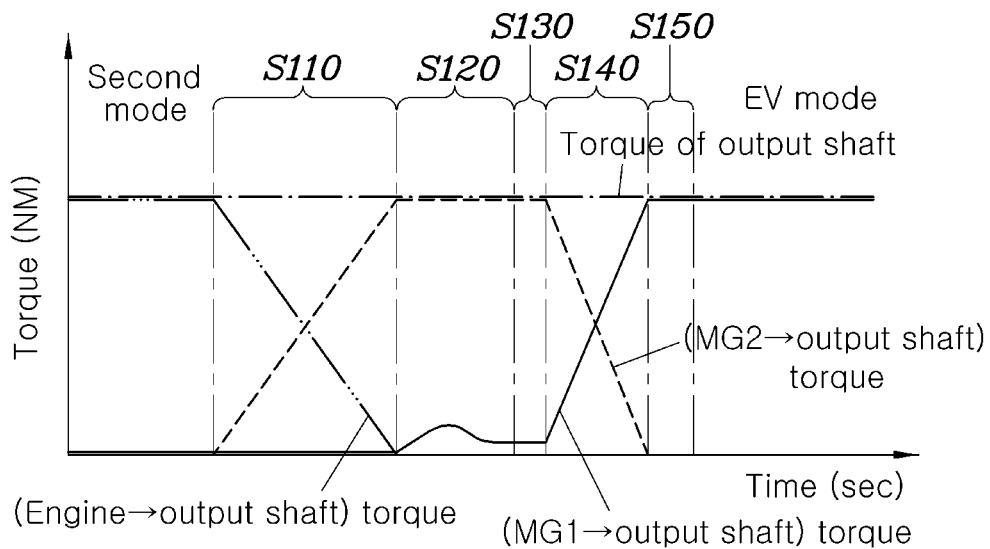
FIG. 23 is a graph showing changes in torque according to the various exemplary embodiments of FIG. 22.
Figure 24:
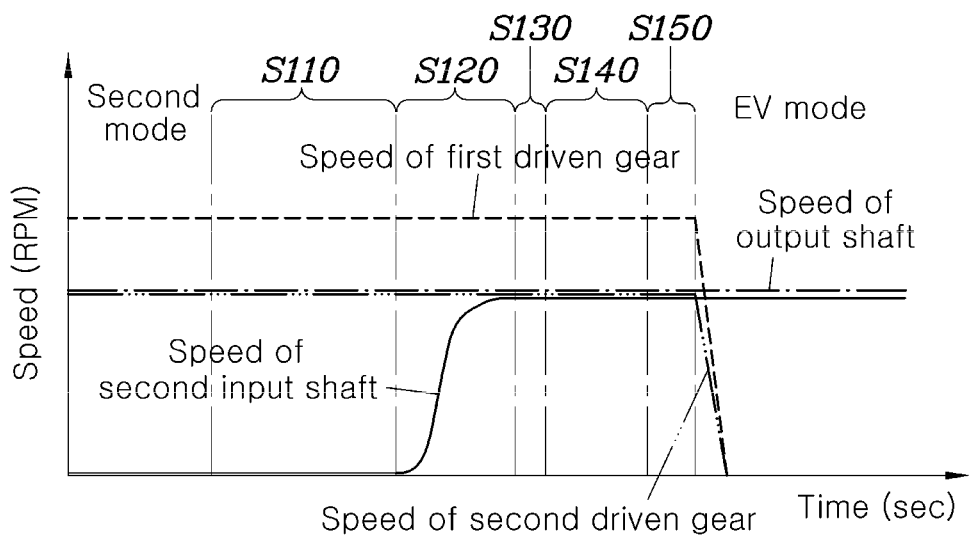
FIG. 24 is a graph showing changes in speed according to the various exemplary embodiments of FIG. 22.
Figure 25:
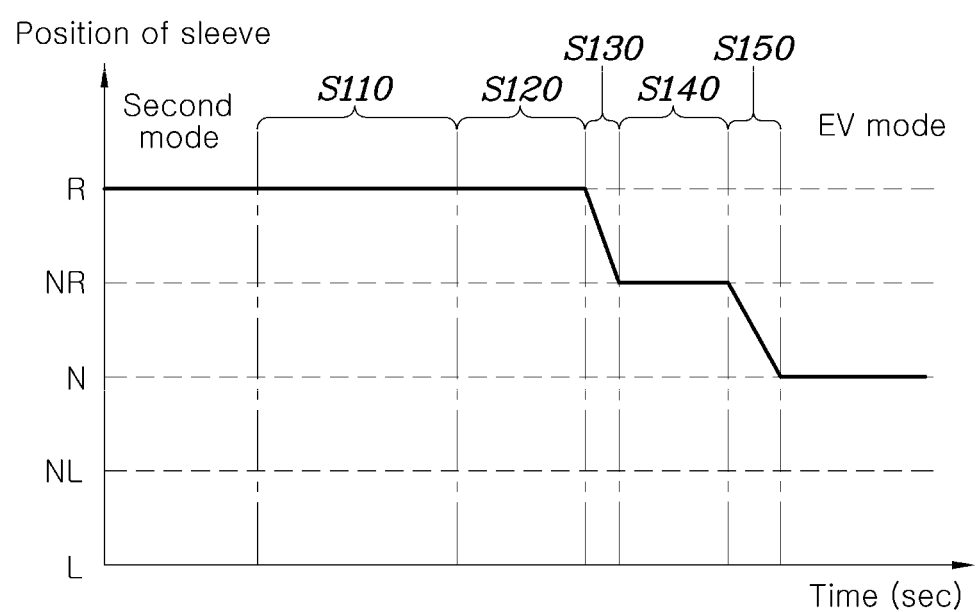
FIG. 25 is a graph showing changes in the position of a sleeve according to the various exemplary embodiments of FIG. 22.

Therefore, in the converging of the torque transferred from the second motor-generator MG2 to the output shaft OUT, to the torque of the output shaft (S110), the sum of the torque transferred from the engine to the output shaft OUT and the torque transferred from the second motor-generator MG2 to the output shaft OUT is conceptually controlled to continuously remain the same. See S110 in FIGS. 19 and 23.

Furthermore, in the converging of the torque transferred from the first motor-generator MG1 to the output shaft OUT, to the torque of the output shaft (S140), the torque is also controlled according to a concept similar to the concept described above. If the torque which has been provided to the output shaft OUT by the second motor-generator MG2 is referred to as "the torque of the output shaft", operation S140 also implies gradually decreasing the torque provided from the second motor-generator MG2 to the output shaft OUT and gradually increasing the torque provided from the first motor-generator MG1 to the output shaft OUT, to allow the torque provided from the first motor-generator MG1 to the output shaft OUT, to ultimately reach "the torque of the output shaft".

Therefore, in operation S140, the sum of the torque transferred from the second motor-generator MG2 to the output shaft OUT and the torque transferred from the first motor-generator MG1 to the output shaft OUT is conceptually controlled to continuously remain the same. See S140 in FIGS. 19 and 23.

A case where, when the first input shaft IN1 is operated by the engine to allow the vehicle to travel, the power of the first input shaft IN1 is transferred to the output shaft OUT through a first gear pair corresponds to the various exemplary embodiments of FIG. 18.

In the various exemplary embodiments of the present invention of FIG. 18, the moving of the sleeve SB to connect the second input shaft IN2 to the hub gear HG of the output shaft OUT includes: primarily moving the sleeve SB such that the sleeve SB is gear-engaged to all of a first clutch gear CG1 of a first driven gear P1, the hub gear HG of the output shaft OUT, and the third clutch gear CG3 of the second input shaft IN2 (S130-1).

Furthermore, after the sleeve SB is primarily moved, the sleeve SB is secondarily moved such that the sleeve is disconnected from the first clutch gear CG1 and is gear-engaged only to the hub gear HG and the third clutch gear CG3 (S150-1).

That is, when the sleeve SB is primarily moved, the sleeve SB, the first section S1 of which has been gear-engaged to the first clutch gear CG1 and the second section S2 of which has been gear-engaged to the hub gear HG, is moved such that the first section S1 of the sleeve SB is additionally gear-engaged to the hub gear HG while being gear-engaged to the first clutch gear CG1, and the second section S2 is additionally gear-engaged to the third clutch gear CG3 while being gear-engaged to the hub gear HG.

Furthermore, when the sleeve SB is secondarily moved, the first section S1 of the sleeve SB is disconnected from the first clutch gear CG1 and is gear-engaged only to the hub gear HG, and the second section S2 is disconnected from the hub gear HG and is gear-engaged only to the third clutch gear CG3.

For reference, the operation of increasing of the torque of the first motor-generator MG1 and decreasing of the torque of the second motor-generator MG2 to converge the torque of the first motor-generator MG1 to the torque of the output shaft (S140) may be performed any time after the primary moving of the sleeve SB. Although operation S140 is illustrated in FIG. 18 to be performed after the primary moving of the sleeve SB and before the secondary moving of the sleeve SB, operation S140 and the secondary moving of the sleeve SB may be practically performed at the same time.

A case where, when the first input shaft IN1 is operated by the engine to allow the vehicle to travel, the power of the first input shaft IN1 is transferred to the output shaft OUT through a second gear pair corresponds to the various exemplary embodiments of FIG. 22.

In the various exemplary embodiments of the present invention in FIG. 22, the moving of the sleeve SB to connect the second input shaft IN2 to the hub gear HG of the output shaft OUT includes: primarily moving the sleeve SB such that the sleeve SB is gear-engaged to all of a second clutch gear CG2 of a second driven gear P2, the hub gear HG of the output shaft OUT, and the third clutch gear CG3 of the second input shaft IN2 (S130-2).

After the sleeve SB is primarily moved, the sleeve SB is secondarily moved such that the sleeve is disconnected from the second clutch gear CG2 and is gear-engaged only to the hub gear HG and the third clutch gear CG3 (S150-2).

That is, when the sleeve SB is primarily moved, the sleeve SB, the first section S1 of which has been gear-engaged to the hub gear HG and the second section S2 of which has been gear-engaged to the second clutch gear CG2, is moved such that the first section S1 of the sleeve SB is maintained to be gear-engaged to the hub gear HG, and the second section S2 is additionally gear-engaged to the third clutch gear CG3 while being gear-engaged to the second clutch gear CG2.

Furthermore, when the sleeve SB is secondarily moved, the first section S1 of the sleeve SB is maintained to be gear-engaged to the hub gear HG, and the second section S2 is disconnected from the second clutch gear CG2 and is gear-engaged only to the third clutch gear CG3.

Similarly, in the various exemplary embodiments of the present invention in FIG. 22, the operation of increasing of the torque of the first motor-generator MG1 and decreasing of the torque of the second motor-generator MG2 to converge the torque of the first motor-generator MG1 to the torque of the output shaft (S140) may be performed any time after the primary moving of the sleeve SB. Although operation S140 is illustrated in FIG. 22 to be performed after the primary moving of the sleeve SB and before the secondary moving of the sleeve SB, operation S140 and the secondary moving of the sleeve SB may be practically performed at the same time.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a power train apparatus of a vehicle, the method comprising:
   while a second input shaft is operated by the first motor-generator to allow the vehicle to travel in an electric vehicle (EV) mode, driving, by a controller, a first input shaft connected to a second motor-generator by the second motor-generator to synchronize a speed of a predetermined driven gear of a target gear position with a speed of an output shaft;
   primarily moving, by the controller, a sleeve to directly connect the second input shaft, the output shaft, and the driven gear of the target gear position;
   decreasing, by the controller, torque of the first motor-generator and increasing torque of the second motor-generator to converge torque transferred from the second motor-generator to the output shaft, to torque of the output shaft;
   secondarily moving, by the controller, the sleeve to release the second input shaft and maintain the output shaft and the driven gear of the target gear position to be directly connected; and
   increasing, by the controller, torque of an engine connected to the first input shaft and decreasing the torque of the second motor-generator to converge torque transferred from the engine to the output shaft, to the torque of the output shaft.

2. The method of claim 1, further including:
   after the sleeve is secondarily moved to release the second input shaft from the output shaft, turning, by the controller, off the first motor-generator.

3. The method of claim 1, further including:
   before the converging of the torque transferred from the engine to the output shaft, to the torque of the output shaft, starting, by the controller, the engine.

4. The method of claim 1, wherein when the target gear position is a first gear position, the primarily moving of the sleeve includes moving the sleeve, which has been gear-engaged to a clutch gear fixed to the second input shaft and a hub gear fixed to the output shaft so that the sleeve is additionally gear-engaged to a clutch gear integrally connected to a first driven gear.

5. The method of claim 4, wherein the primarily moving of the sleeve includes moving the sleeve, a first section which has been gear-engaged to the hub gear and a second section of which has been gear-engaged to the clutch gear fixed to the second input shaft so that the first section of the sleeve is additionally gear-engaged to the clutch gear integrally connected to the first driven gear while being gear-engaged to the hub gear, and the second section of the sleeve is additionally gear-engaged to the hub gear while being gear-engaged to the clutch gear fixed to the second input shaft.

6. The method of claim 5, wherein the secondarily moving of the sleeve includes moving the sleeve so that the first section of the sleeve is disconnected from the hub gear and is gear-engaged to the clutch gear integrally connected to the first driven gear, and the second section of the sleeve is disconnected from the clutch gear fixed to the second input shaft and is gear-engaged to the hub gear.

7. The method of claim 1, wherein when the target gear position is a second gear position, the primarily moving of the sleeve includes moving the sleeve, which has been gear-engaged to a clutch gear fixed to the second input shaft and a hub gear fixed to the output shaft so that the sleeve is additionally gear-engaged to a clutch gear fixedly connected to a second driven gear rotatably mounted on the second input shaft.

8. The method of claim 7, wherein the primarily moving of the sleeve includes moving the sleeve, a first section of which has been gear-engaged to the hub gear and a second section of which has been gear-engaged to the clutch gear fixed to the second input shaft so that the first section of the sleeve is maintained to be gear-engaged to the hub gear, and the second section of the sleeve is additionally gear-engaged to the clutch gear fixedly connected to the second driven gear while being gear-engaged to the clutch gear fixed to the second input shaft.

9. The method of claim 7, wherein the secondarily moving of the sleeve includes moving the sleeve so that a first section of the sleeve is maintained to be gear-engaged to the hub gear, and a second section of the sleeve is disconnected from the clutch gear fixed to the second input shaft and is gear-engaged to the clutch gear fixedly connected to the second driven gear.

10. The method of claim 1, wherein the power train apparatus includes:
   the first input shaft receiving an input power;
   the output shaft;
   the second input shaft;
   the first motor-generator and the second motor-generator;
   a first gear pair mounted between the first input shaft and the output shaft and a second gear pair mounted between the first input shaft and the second input shaft, to selectively transfer power of the first input shaft to the output shaft;
   a clutch device mounted to selectively transfer power transferred through the first gear pair, the second gear pair, and the second input shaft to the output shaft; and
   the controller,
   wherein the first gear pair includes a first drive gear fixed to the first input shaft, and a first driven gear gear-engaged to the first drive gear and rotatably mounted on the output shaft,
   wherein the second gear pair includes a second drive gear fixed to the first input shaft, and a second driven gear gear-engaged to the second drive gear and rotatably mounted on the second input shaft,
   wherein the clutch device includes:
   a first clutch gear directly connected to the first driven gear;
   a second clutch gear directly connected to the second driven gear;

a third clutch gear directly connected to the second input shaft;
a hub fixedly mounted on the output shaft; and
the sleeve configured to be slidable on the hub to selectively couple the hub to at least one of the first clutch gear, the second clutch gear and the third clutch gear, and wherein the controller includes:
a processor; and
a non-transitory storage medium on which a program for performing the method of claim 1 is recorded and executed by the processor.

* * * * *